(12) United States Patent
Booker et al.

(10) Patent No.: US 8,123,996 B2
(45) Date of Patent: Feb. 28, 2012

(54) WRINKLE CONTROL FOR COMPOSITE TUBES

(75) Inventors: Garry A. Booker, Lake Stevens, WA (US); Wesley L. Holman, Millcreek, WA (US)

(73) Assignee: The Boeing Company, Chicago, IL (US)

( * ) Notice: Subject to any disclaimer, the term of this patent is extended or adjusted under 35 U.S.C. 154(b) by 1036 days.

(21) Appl. No.: 12/027,800

(22) Filed: Feb. 7, 2008

(65) Prior Publication Data

US 2009/0202767 A1 Aug. 13, 2009

(51) Int. Cl.
*B29C 70/44* (2006.01)
*B32B 37/00* (2006.01)

(52) U.S. Cl. .......... 264/258; 264/257; 264/241; 156/60; 156/160; 156/297; 156/298

(58) Field of Classification Search ................... 264/258, 264/257, 241; 156/60, 160, 297, 298
See application file for complete search history.

(56) References Cited

U.S. PATENT DOCUMENTS

| | | | |
|---|---|---|---|
| 4,608,220 A | 8/1986 | Caldwell et al. |
| 4,780,262 A | 10/1988 | VonVolkli |
| 5,939,006 A | 8/1999 | Wang et al. |

*Primary Examiner* — MIchael C Miggins
(74) *Attorney, Agent, or Firm* — Klintworth & Rozenblat IP LLC

(57) ABSTRACT

In one step of a method of fabricating a composite tube, layers of uncured composite material may be laid over a surface. In another step, spaced-apart strips of at least one of uncured, partially cured, and completely cured composite material may be laid lengthwise over the laid layers of composite material. In still another step, the spaced-apart strips may be compacted against the layers of uncured composite material. In an additional step, the compacted spaced-apart strips and the layers of uncured composite material may be further consolidated and/or cured to form a composite tube.

12 Claims, 12 Drawing Sheets

WRINKLE CONTROL FOR COMPOSITE TUBES

BACKGROUND

Many of the existing methods for forming composite tubes may result in composite tubes having uncontrolled wrinkle formation. For instance, under one existing method for forming a composite tube, layers of uncured composite material are laid up in tubular formation, the laid-up layers are bagged and suctioned using a vacuum, and the bagged and suctioned laid-up layers are then cured in an autoclave. However, the resulting composite tube often has uncontrolled wrinkles as a result of the process. Another existing method utilizes the insertion of metallic wires into depressions formed in the composite tube to provide local compaction of material and wrinkle formation control. Still another existing method utilizes outer diameter tooling to apply pressure to the inner diameter of the part to control wrinkle formation. However, one or more of these existing processes may not allow for bonded metallic end fittings to be incorporated into the design, may require extra cure cycles, may require extra tooling, may not allow for the process to be used in local areas of the part, may increase costs, may increase manufacturing time, may experience reliability and/or consistency problems, and/or may experience one or more other types of problems.

A composite tube and/or method of curing a composite tube is needed to decrease one or more problems associated with one or more of the existing composite tubes and/or methods for their manufacture.

SUMMARY

In one aspect of the disclosure, an uncured composite tube may comprise layers of uncured composite material forming a tube, and compacted, spaced-apart strips of at least one of uncured, partially cured, and completely cured composite material laid lengthwise over the layers of uncured composite material.

In another aspect of the disclosure, a method of fabricating a composite tube may be provided. In one step, layers of uncured composite material may be laid over at least one of a surface and a tool. In another step, spaced-apart strips of at least one of uncured, partially cured, and completely cured composite material may be laid lengthwise over the laid layers of composite material. In still another step, the spaced-apart strips may be compacted against the layers of uncured composite material. In an additional step, the compacted spaced-apart strips and the layers of uncured composite material may be at least one of cured and consolidated to form a composite tube.

These and other features, aspects and advantages of the disclosure will become better understood with reference to the following drawings, description and claims.

BRIEF DESCRIPTION OF THE DRAWINGS

FIG. 4A shows a perspective view of a oval cross-sectional shape of a compaction strip under one embodiment of the disclosure;

FIG. 4B shows a perspective view of a circular cross-sectional shape of a compaction strip under one embodiment of the disclosure;

FIG. 4C shows a perspective view of a eye shape of a compaction strip under one embodiment of the disclosure;

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
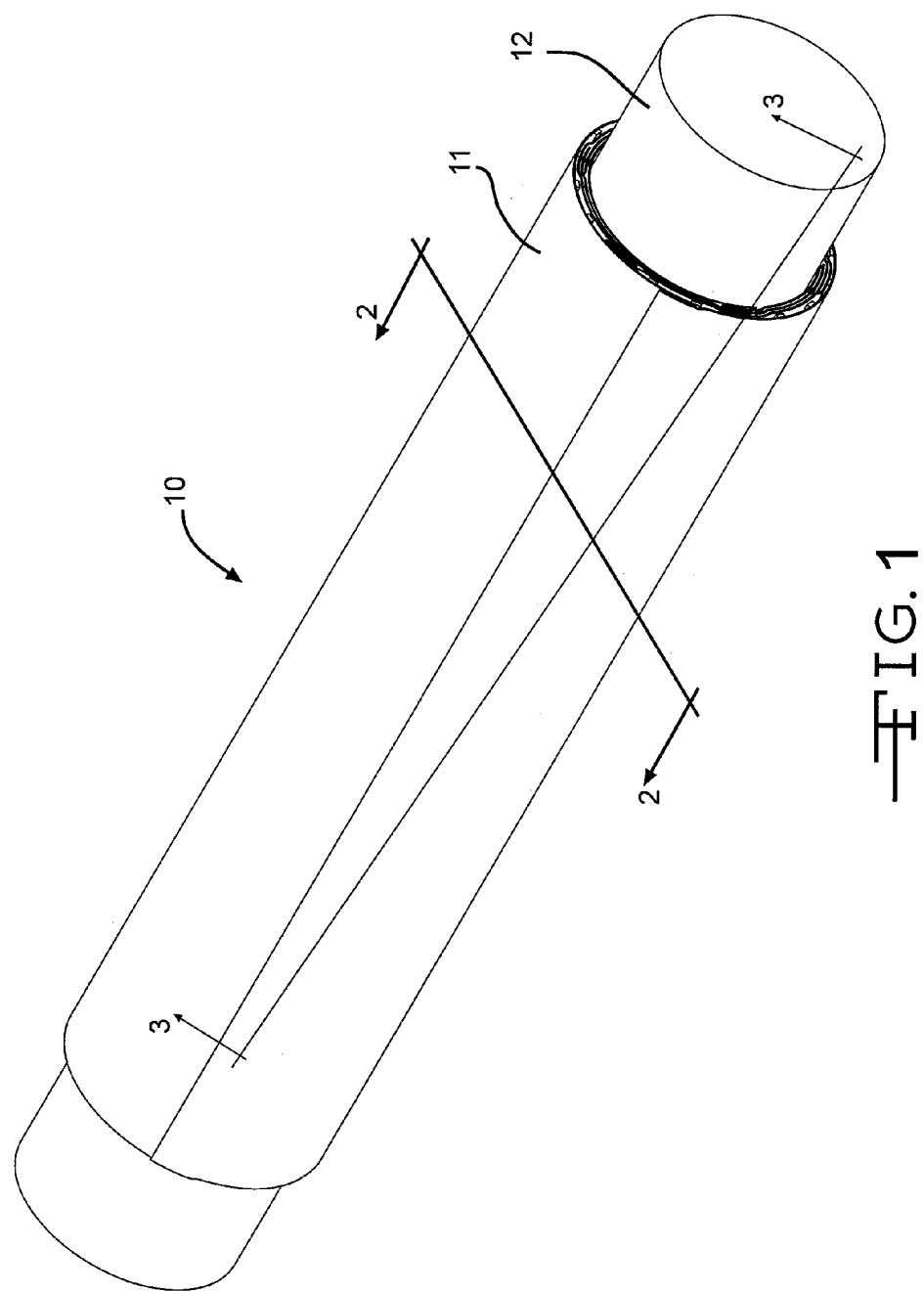
FIG. 1 shows a perspective view of one embodiment of an uncured composite tube.
Figure 2:
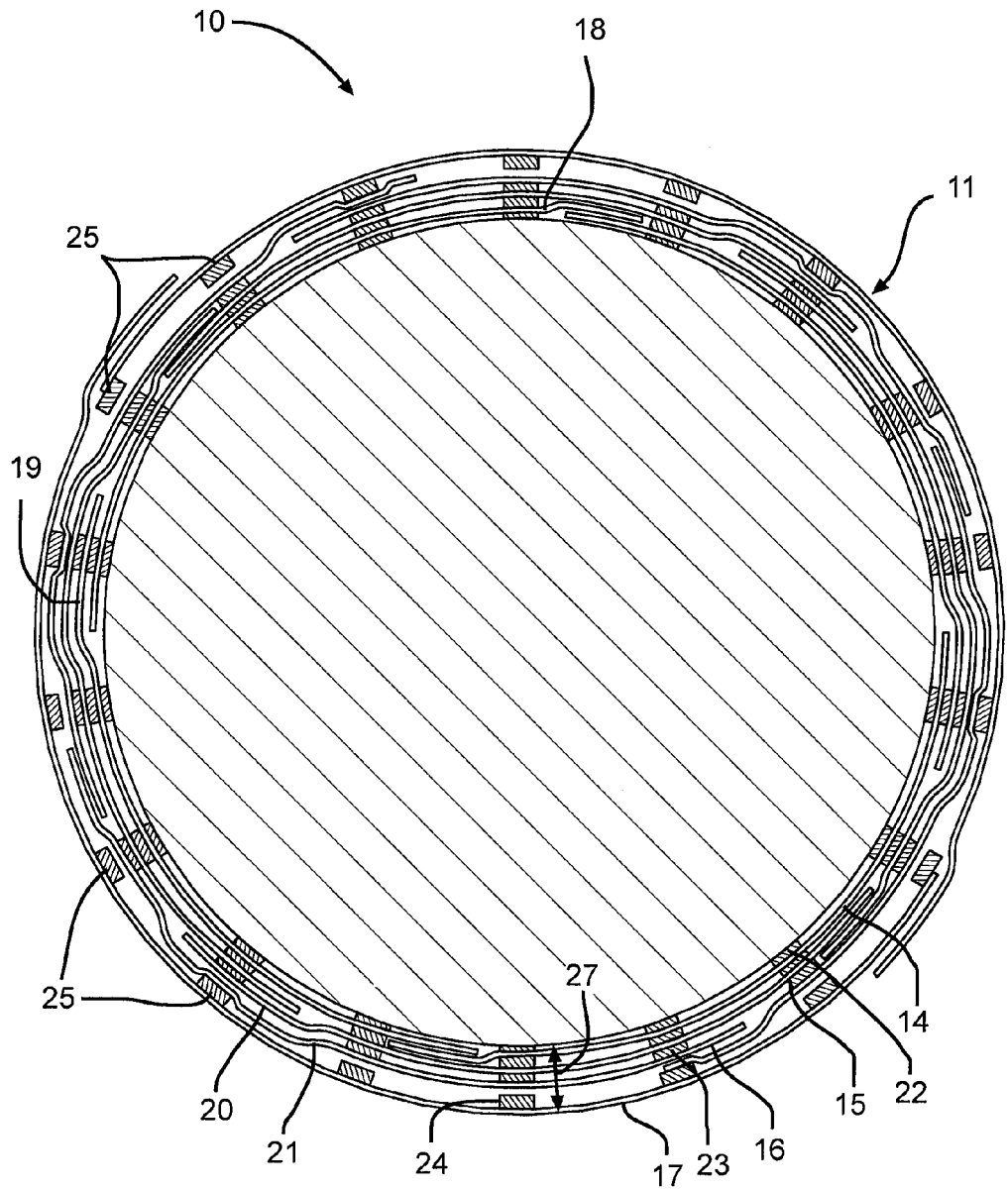
FIG. 2 shows a radial cross-sectional view along line 2-2 of FIG. 1.
Figure 3:
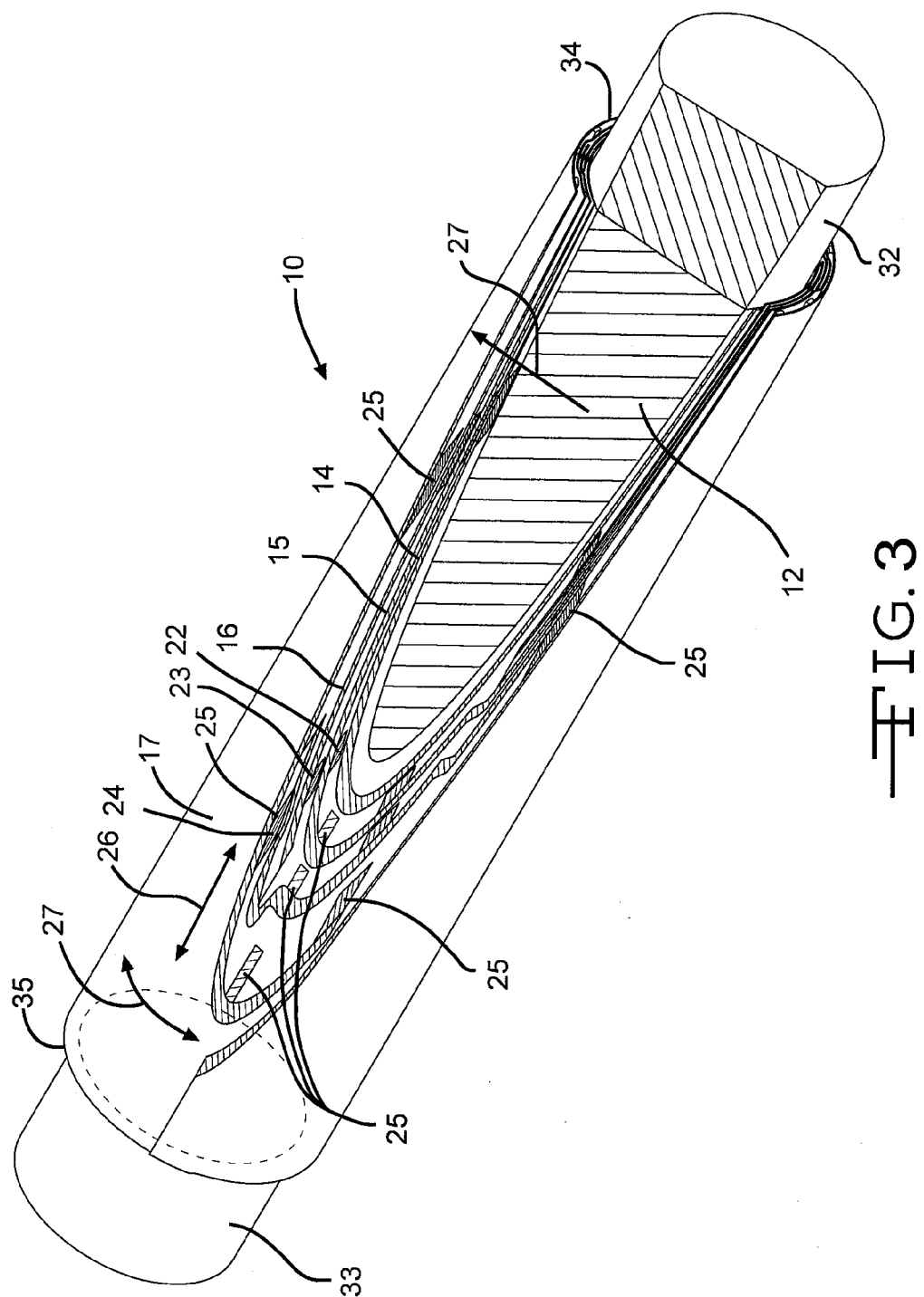
FIG. 3 shows an axial cross-sectional view along line 3-3 of FIG. 1.

FIG. 1 shows a perspective view of one embodiment of an uncured composite tube 10. FIG. 2 shows a radial cross-sectional view along line 2-2 of FIG. 1. FIG. 3 shows an axial cross-sectional view along line 3-3 of FIG. 1. The uncured composite tube 10 may comprise an aircraft part. In other embodiments, the uncured composite tube 10 may comprise non-aircraft parts. As shown in FIGS. 1-3, the uncured composite tube 10 may be disposed and/or laid over a surface 12 such as a tool or another type of surface. The surface 12 may comprise a mandrel, other type of tool, or a subcomponent of the part. The uncured composite tube 10 may comprise thick-walls 11 of many layers of composite material oriented in multi-directions. The uncured composite tube 10 may comprise layers 14, 15, 16, and 17 of uncured composite material laid-up on the surface 12 in a tube-shape. The layers 14, 15, 16, and 17 of uncured composite material may comprise discrete sections 18, 19, 20, and 21 of uncured composite material disposed near and/or against each other to form the tube-shape. The layers 14, 15, 16, and 17 of uncured composite material may comprise at least one of uncured composite materials such as Carbon Fiber Reinforced Plastic (CFRP), Boron Fiber Reinforced Plastic, Glass Fiber Reinforced Plastic, Silicon Carbide Fiber or Alumina Reinforced Metals, Fiber Reinforced Ceramics, and/or other type of uncured or unconsolidated composite materials. In other embodiments, the layers 14, 15, 16, and 17 may be of varying shapes, sizes, orientations, configurations, number, types, and/or materials.

Layers 22, 23, and 24 of compacted, spaced-apart strips 25 may be disposed in a lengthwise direction 26 within, over, and/or under the layers 14, 15, 16, and 17 of the uncured composite material. The strips 25 of each layer 22, 23, and 24 may be spaced-apart in substantially parallel formation in a radial direction 27 around the tube 10. The layers 14, 15, 16, and 17 of uncured composite material and the layers 22, 23, and 24 of compacted, spaced-apart strips 25 may be disposed on top of one another in alternating arrangement. The strips 25 may be narrow in a width direction 59 (see FIG. 7), may comprise uncured, partially cured, and/or completely cured composite material, and/or may be oriented along the tube. The strips 25 may comprise lengthwise plies made out of the same material as the tube 10. The strips 25 may comprise at least one of uncured composite materials such as Carbon Fiber Reinforced Plastic (CFRP), Boron Fiber Reinforced Plastic, Glass Fiber Reinforced Plastic, Silicon Carbide Fiber or Alumina Reinforced Metals, Fiber Reinforced Ceramics, and/or other type of uncured or un-consolidated composite materials. The strips 25 may have been compacted against the layers 14, 15, 16, and 17 of uncured composite material through a pressure application process such as vacuum bagging or external positive pressure tooling. Metallic end-fittings 32 and 33 may be disposed against ends 34 and 35 of the uncured composite tube 10.

Figure 4:
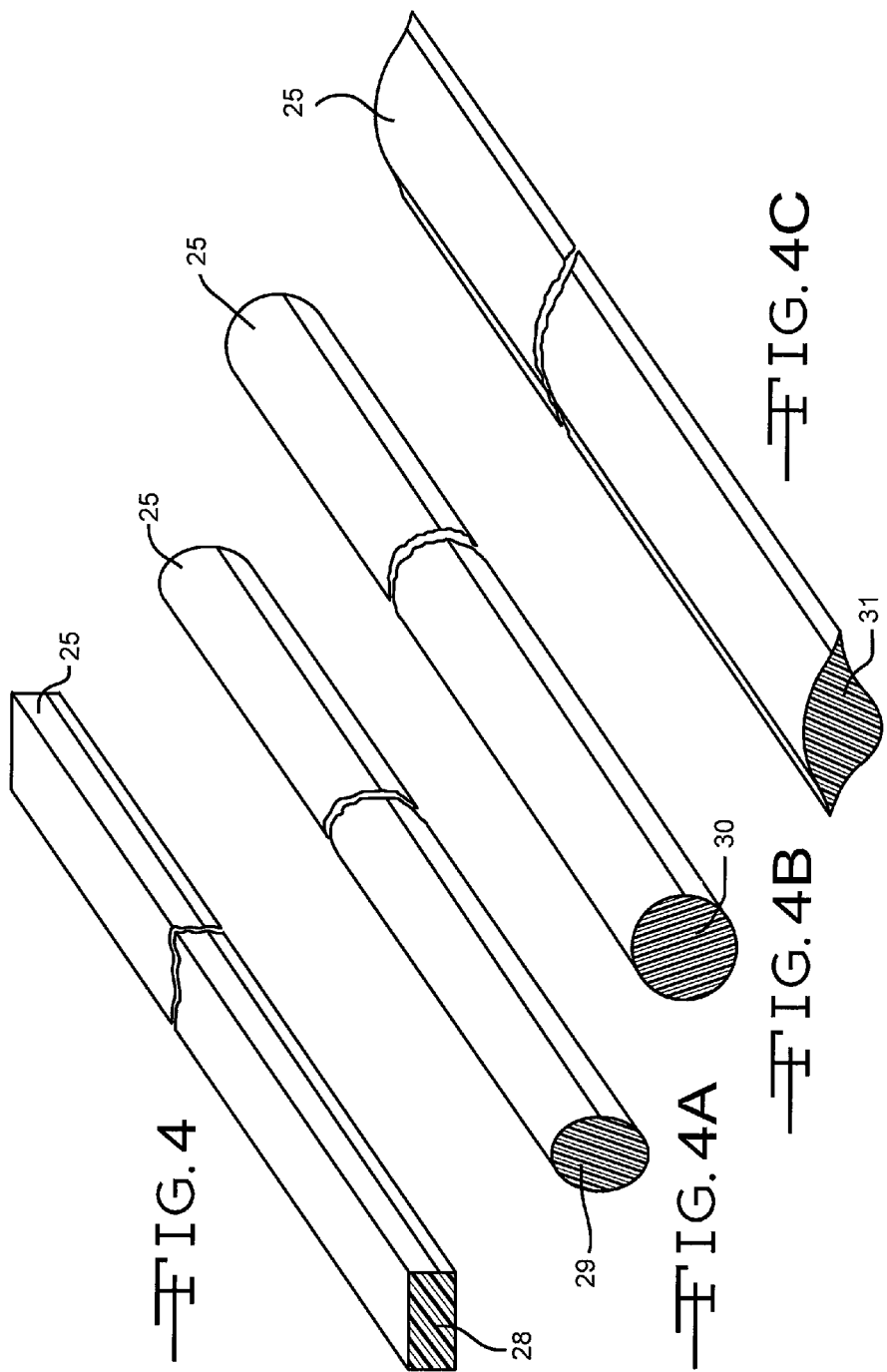
FIG. 4 shows a perspective view of a rectangular cross-sectional shape of a compaction strip under one embodiment of the disclosure.

FIGS. 4-4C show perspective views of various cross-sectional shapes which the strips 25 may have, including a rectangular shape 28 shown in FIG. 4, an oval shape 29 shown in FIG. 4A, a circular shape 30 shown in FIG. 4B, and an eye shape 31 shown in FIG. 4C. In other embodiments, the strips 25 may be of varying shapes, sizes, orientations, configurations, number, types, and/or materials.

Figure 5:
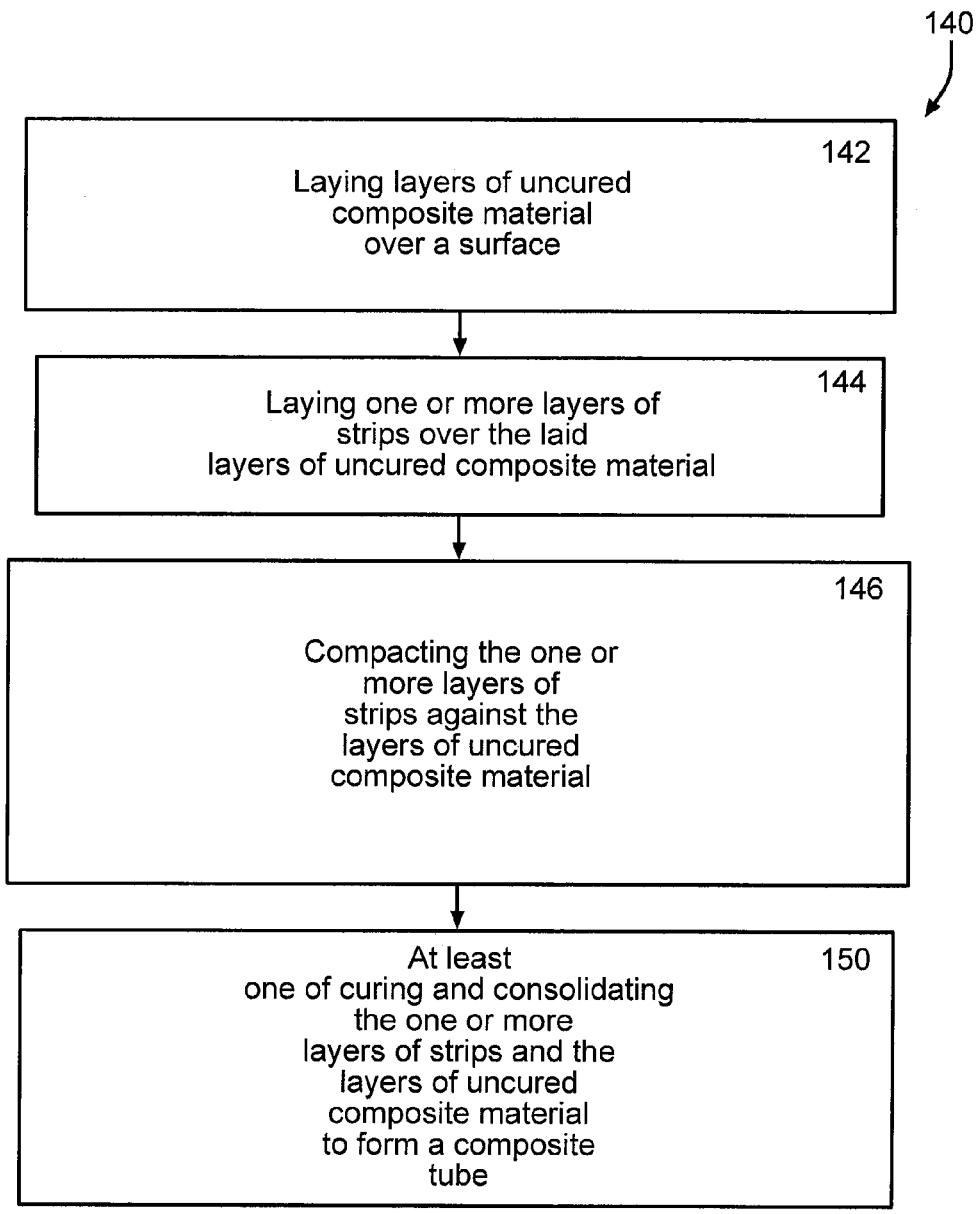
FIG. 5 shows a flowchart of one embodiment of a method of fabricating a composite tube.
Figure 6:
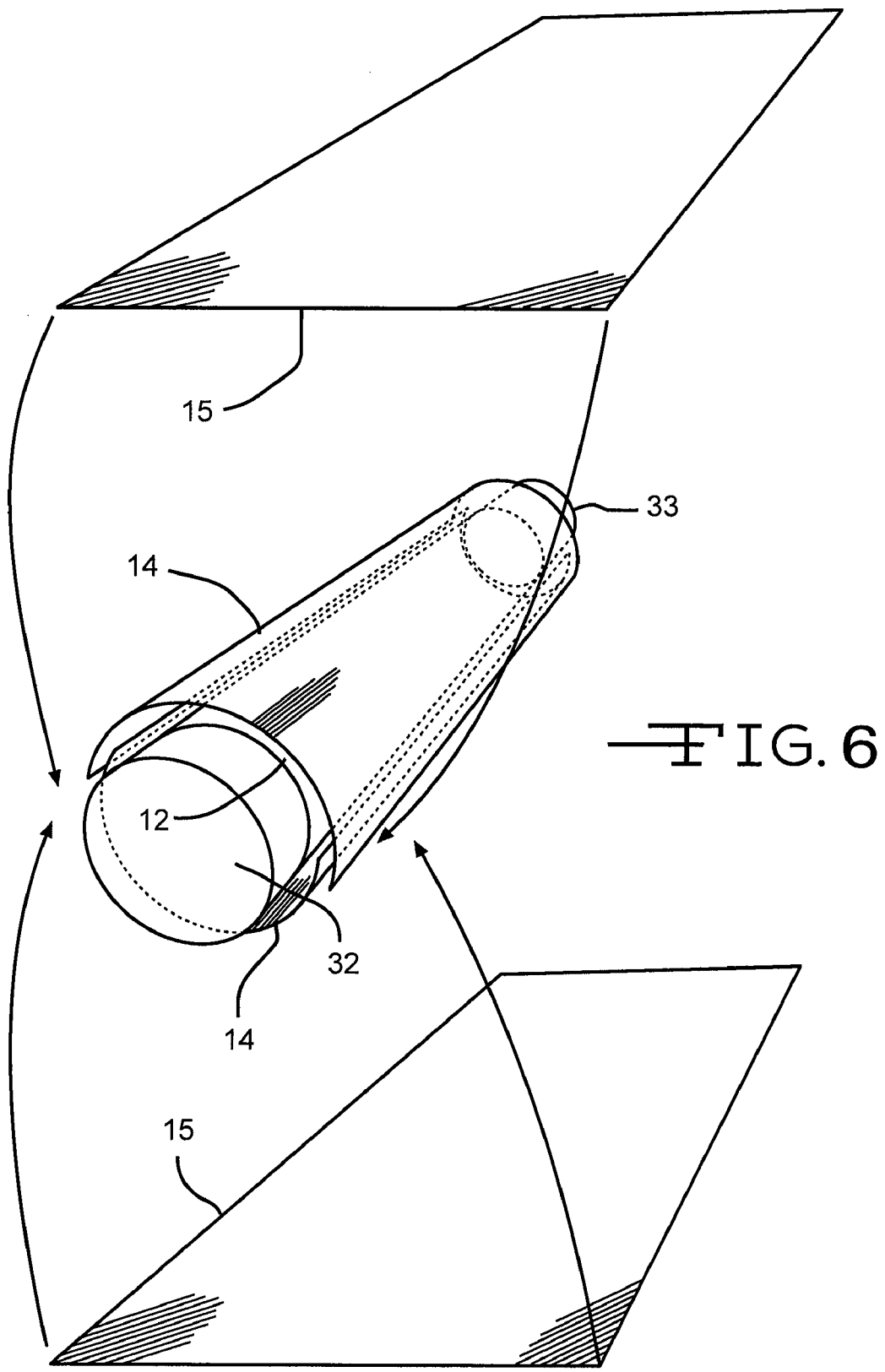
FIG. 6 shows layers of uncured composite material being laid over a surface under one step of the method of FIG. 5.

FIG. 5 shows a flowchart of one embodiment of a method 140 of fabricating a composite tube 10 as shown in FIG. 3. The composite tube 10 being fabricated may comprise an aircraft or non-aircraft part. In one step 142, as shown in the perspective view of FIG. 7, layers 14, 15, 16, and 17 of uncured composite material may be laid over a surface 12 such as a tool or another type of surface. The layers 14, 15, 16, and 17 of uncured composite material may comprise any of the embodiments disclosed herein. The laying step 142 may further comprise disposing the layers of 14, 15, 16, and 17 of uncured composite material being laid against metallic end-fittings 32 and 33. The laying step 142 may additionally comprise, as shown in FIG. 2, laying discrete sections 18, 19, 20, and 21 of uncured composite material near and/or against one another to form the laid-up layers 14, 15, 16, and 17 of the uncured composite material around the surface 12.

Figure 7:
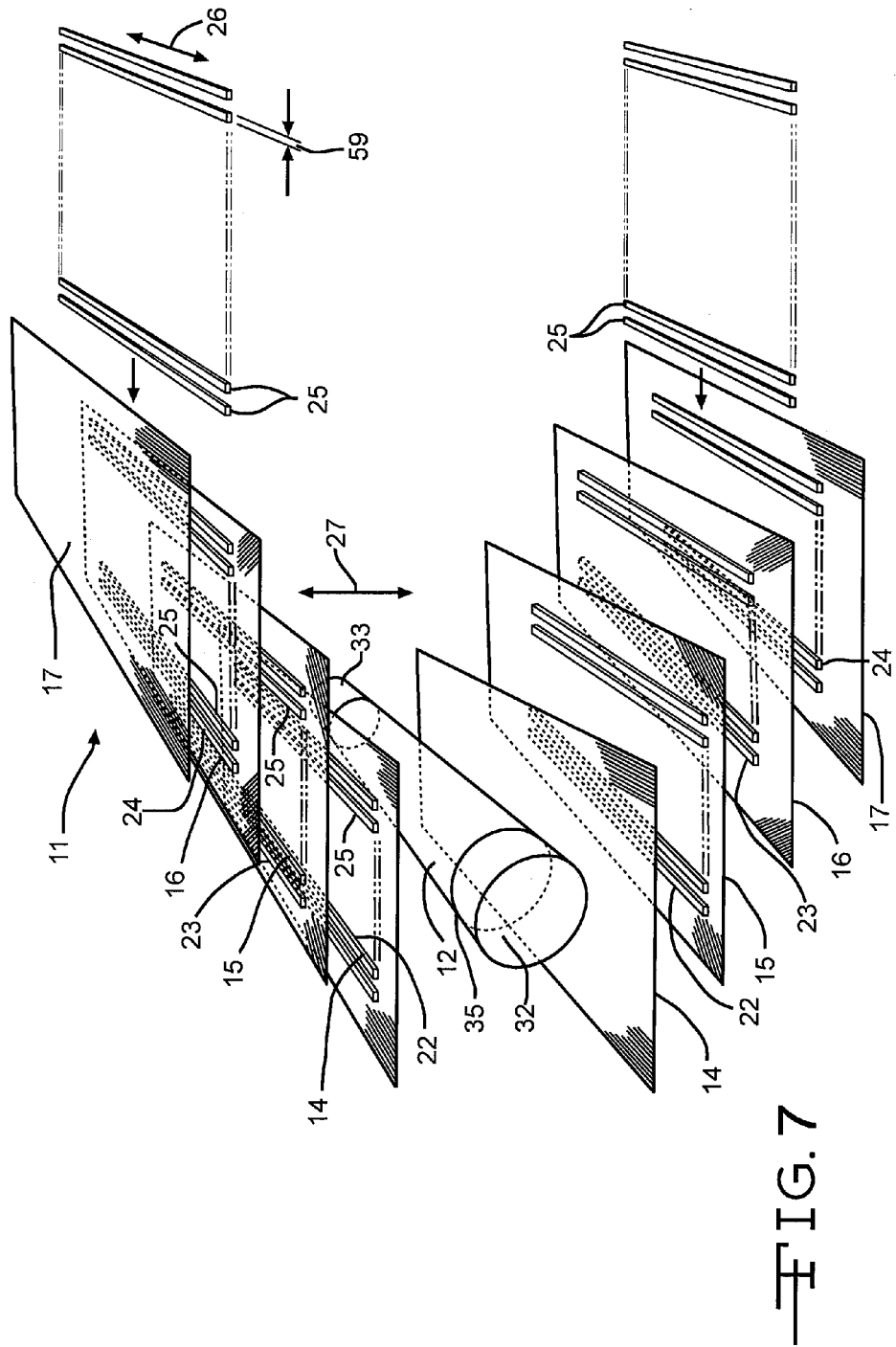
FIG. 7 shows one or more layers of strips being laid in a lengthwise direction and spaced-apart in a radial direction over laid layers of uncured composite material under another step of the method of FIG. 5.

In another step 144, as shown in the perspective view of FIG. 7, one or more layers 22, 23, and 24 of strips 25 may be laid in a lengthwise direction 26 and spaced-apart in a radial direction 27 over the laid layers 14, 15, 16, and 17 of uncured composite material. The strips 25 may be uncured, partially cured, and/or completely cured and may comprise any of the embodiments disclosed herein. Step 144 may further comprise laying the spaced-apart strips 25 of each layer 22, 23, and 24 in substantially parallel formation around the layers 14, 15, 16, and 17 of uncured composite material. Step 144 may additionally comprise alternately laying layers 14, 15, 16, and 17 of uncured composite material with respect to layers 22, 23, and 24 of the spaced-apart strips 25 to form layers 22, 23, and 24 of spaced-apart strips alternating within the layers 14, 15, 16, and 17 of uncured composite material.

Figure 8:
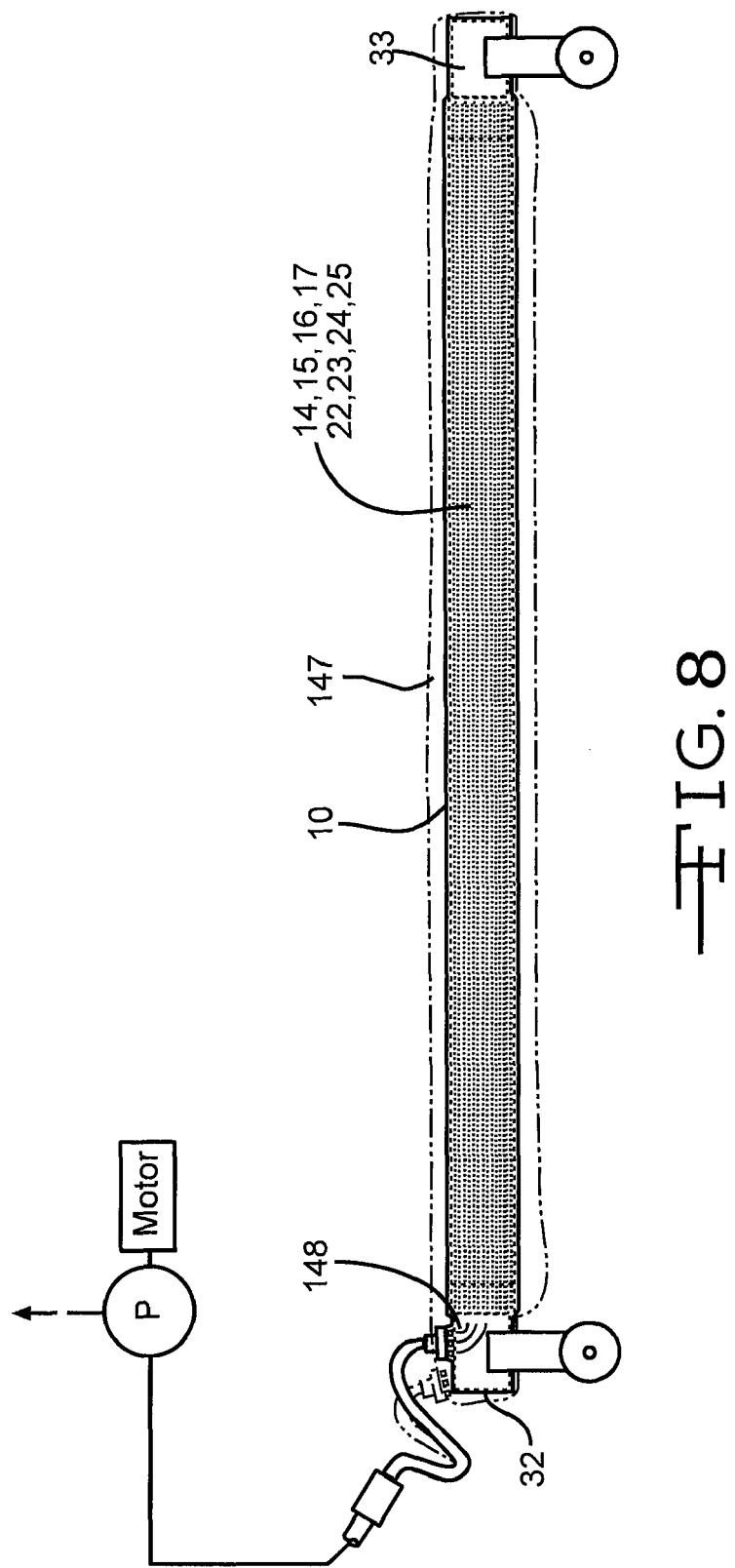
FIG. 8 shows a bag being placed over laid-up layers of composite material and layers of spaced-apart strips and pressure being applied within the bag to compact the layers of spaced-apart strips against the layers of composite material under another step of the method of FIG. 5.

In another step 146, the layers 22, 23, and 24 of laid-spaced-apart strips 25 may be compacted against the layers 14, 15, 16, and 17 of uncured composite material. As shown in FIG. 8, step 146 may comprise placing a bag 147 over the laid-up layers 14, 15, 16, and 17 of uncured composite material and layers 22, 23, and 24 of the spaced-apart strips 25 and applying vacuum pressure 148 through the fitting 32 to within the bag 147 to compact the layers 22, 23, and 24 of spaced-apart strips 25 against the layers 14, 15, 16, and 17 of uncured and/or unconsolidated composite material in order to cause a controlled depression/wrinkling in the tube 10 as later discussed and shown in FIGS. 10 and 11. In other embodiments, step 146 may comprise compacting the laid-spaced-apart strips against the layers 14, 15, 16, and 17 of uncured composite material using a tool that applies positive pressure.

Figure 9:
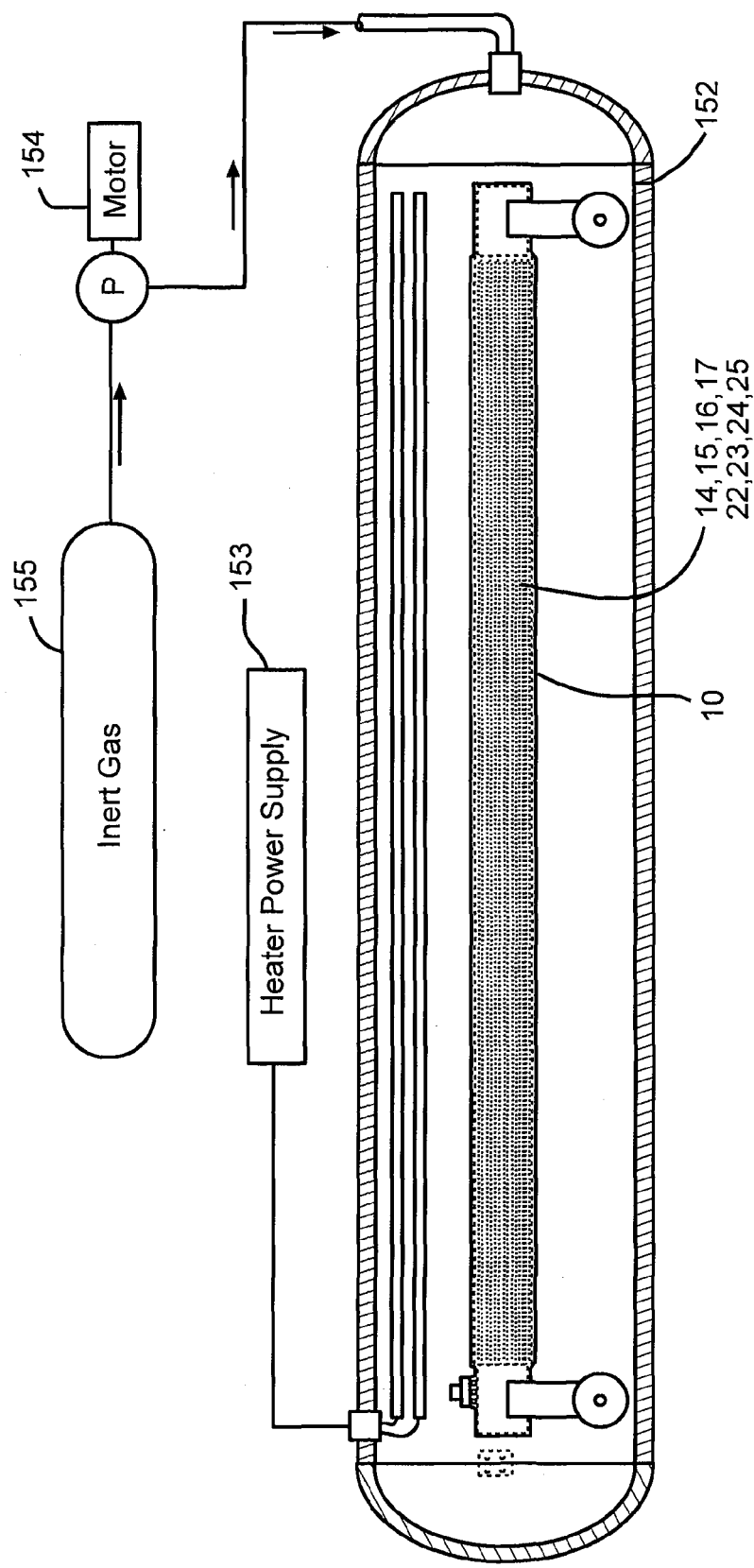
FIG. 9 shows layers of compacted spaced-apart strips and layers of composite material being cured within a temperature and/or heat applying device where elevated temperature and/or pressure are applied to form a composite tube under another step of the method of FIG. 5.

In still another step 150, the layers 22, 23, and 24 of compacted spaced-apart strips 25 and the layers 14, 15, 16, and 17 of uncured composite material may be cured and/or consolidated using heat and/or pressure to form the composite tube 10. As shown in FIG. 9, step 150 may comprise curing the layers 22, 23, and 24 of compacted spaced-apart strips 25 and the layers 14, 15, 16, and 17 of uncured composite material within a temperature and/or pressure applying device 152 at an elevated curing temperature to form the composite tube 10. The temperature and/or pressure applying device 152 may be used to consolidate and cure the strips 25 within the layers 14, 15, 16, and 17 of uncured composite material. The temperature and/or pressure applying device 152 may comprise an autoclave, a hot isostatic pressure vessel, and/or a sintering oven. The temperature and/or pressure applying device 152 may utilize a heater power supply 153 to supply heat and/or a motor 154 forcing inert gas 155 within device 152 in order to apply pressure while applying heat. In other embodiments, the application of heat and/or pressure of step 150 may be done utilizing varying types of equipment and or methods known in the art for applying heat and/or pressure.

Figure 10:
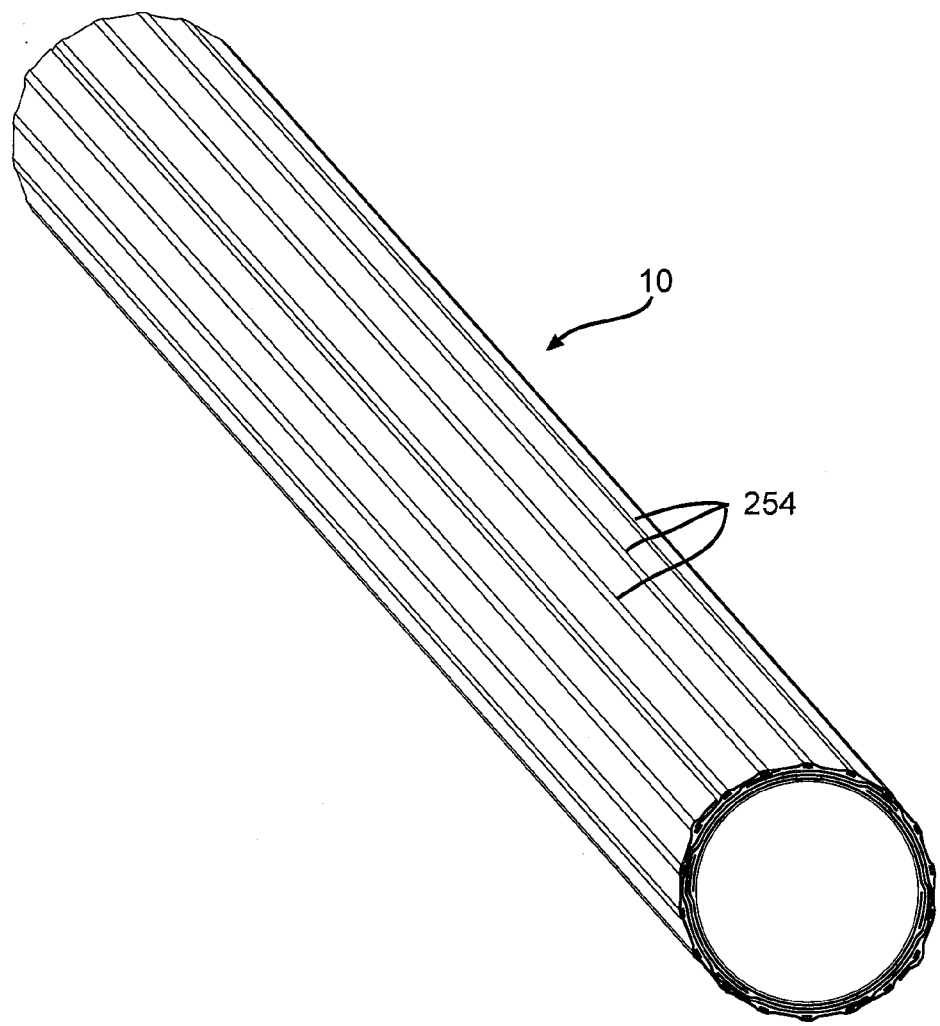
FIG. 10 shows a perspective view of a cured composite tube which may result using the method of FIG. 5.
Figure 11:
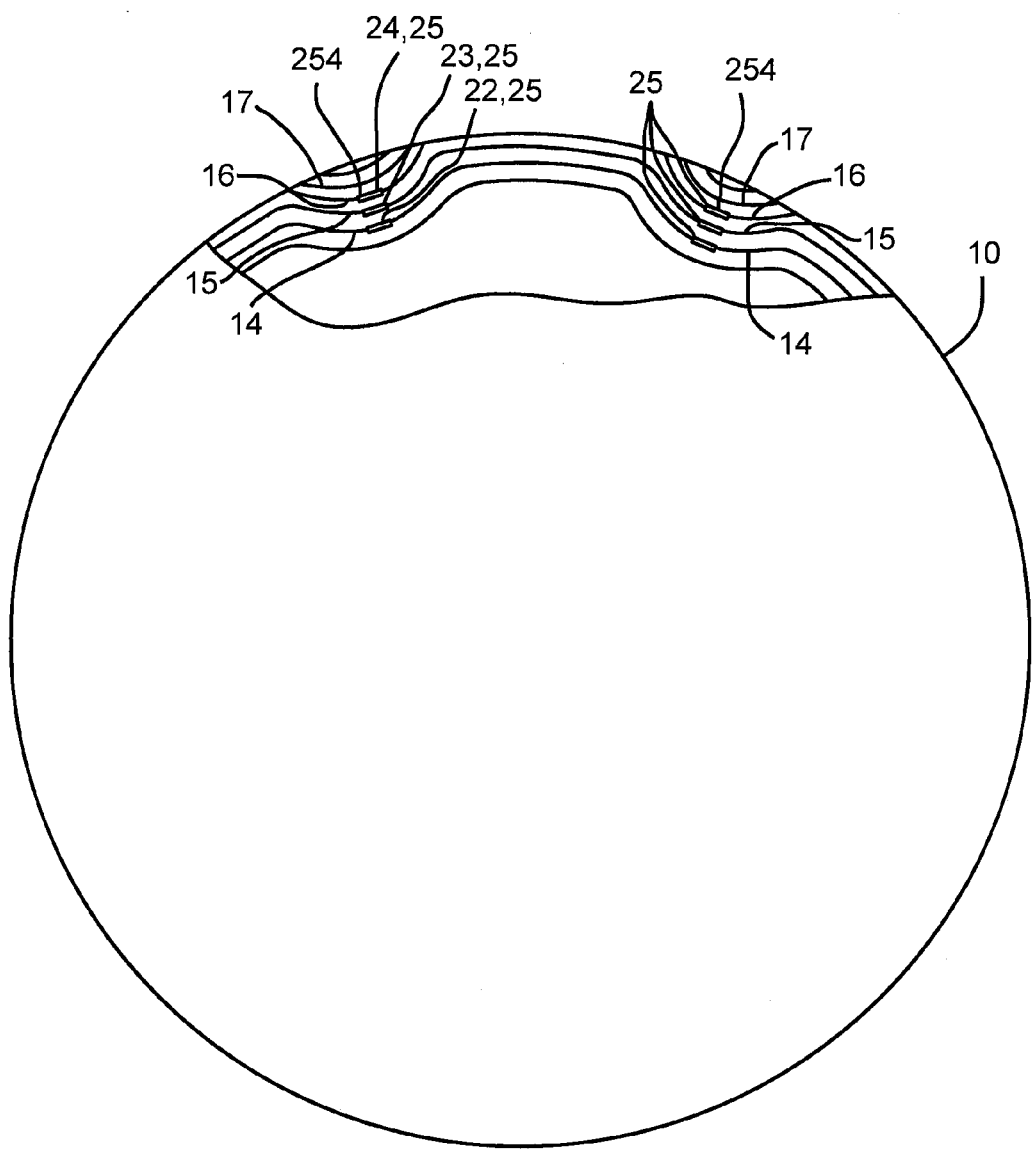
FIG. 11 shows a small representative close-up cross-section portion of a cured composite tube having strips disposed within layers of composite material in order to demonstrate controlled wrinkle formation.

FIG. 10 shows a perspective view of a cured composite tube 10 which may result using the method of FIG. 5. FIG. 11 shows a small representative close-up cross-section portion of a cured composite tube 10 having strips 25 disposed within the layers of composite material 14, 15, 16, and 17 in order to demonstrate the controlled wrinkle formation. As shown in FIGS. 10 and 11, the fully consolidated and/or cured composite tube 10 may have controlled wrinkle formation 254. The controlled wrinkle formation 254 may result because, as shown in FIG. 11, as the tube shrinks during curing the strips 25 may depress and lengthen portions of the layers 14, 15, 16, and 17 around the strips 25 in order to tighten and/or absorb the shrinkage of the layers 14, 15, 16, and 17. As a result, the layers 14, 15, 16, and 17 may remain substantially taut thereby substantially controlling wrinkle formation. The wrinkle formation 254 may be substantially reduced and/or controlled over the wrinkles which may form in one or more of the existing methods of curing and/or consolidating composite tubes.

One or more of the uncured composite tubes and/or methods for fabricating composite tubes of the disclosure may reduce one or more problems of one or more of the existing uncured composite tubes and/or methods. For instance, one or more of the embodiments of the disclosure may result in controlled wrinkle formation which is reduced in size and/or quantity, may result in better and/or more consistent mechanical properties of the cured composite tube, may allow for the bonding of metallic end fittings during the curing of the composite tube, may reduce cure cycles, may reduce the tooling required during manufacture, may reduce costs, may reduce time of manufacturing, and/or may reduce one or more other types of problems of one or more of the existing uncured composite tubes and/or methods.

Figure 12:
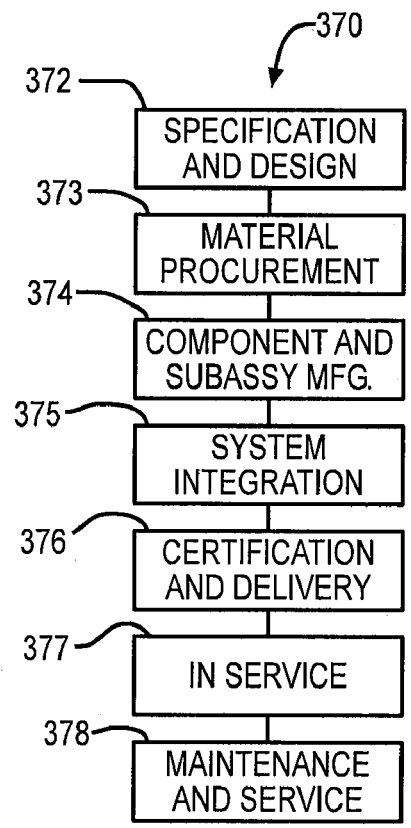
FIG. 12 is a flow diagram of aircraft production and service methodology.
Figure 13:
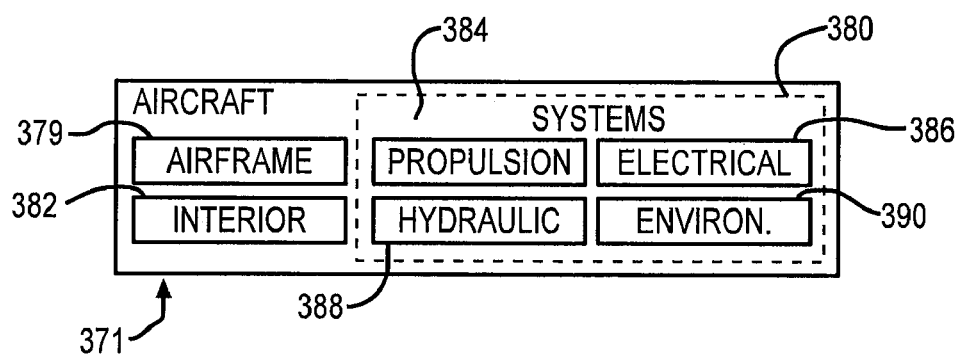
FIG. 13 is a block diagram of an aircraft.

Referring more particularly to the drawings, embodiments of the disclosure may be described in the context of an aircraft manufacturing and service method 370 as shown in FIG. 12 and an aircraft 371 as shown in FIG. 13. During pre-production, exemplary method 370 may include specification and design 372 of the aircraft 371 and material procurement 373. During production, component and subassembly manufacturing 374 and system integration 375 of the aircraft 371 takes place. Thereafter, the aircraft 371 may go through certification and delivery 376 in order to be placed in service 377. While in service by a customer, the aircraft 371 is scheduled for routine maintenance and service 378 (which may also include modification, reconfiguration, refurbishment, and so on).

Each of the processes of method 370 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 13, the aircraft 371 produced by exemplary method 370 may include an airframe 379 with a plurality of systems 380 and an interior 382. Examples of high-level systems 380 include one or more of a propulsion system 384, an electrical system 386, a hydraulic system 388, and an environmental system 390. Any number of other systems may be included. Although an aerospace example is shown, the principles of the invention may be applied to other industries, such as the automotive industry.

Apparatus and methods embodied herein may be employed during any one or more of the stages of the production and service method 370. For example, components or subassemblies corresponding to production process 374 may be fabricated or manufactured in a manner similar to components or subassemblies produced while the aircraft 371 is in service. Also, one or more apparatus embodiments, method embodiments, or a combination thereof may be utilized during the production stages 374 and 375, for example, by substantially expediting assembly of or reducing the cost of an aircraft 379. Similarly, one or more of apparatus embodiments, method embodiments, or a combination thereof may be utilized while the aircraft 379 is in service, for example and without limitation, to maintenance and service 378.

It should be understood, of course, that the foregoing relates to exemplary embodiments of the disclosure and that modifications may be made without departing from the spirit and scope of the disclosure as set forth in the following claims.

The invention claimed is:

1. A method of fabricating a composite tube to control wrinkle formation comprising: laying layers of uncured composite material over a surface or a tool; laying spaced-apart strips of uncured, partially cured, or completely cured composite material lengthwise over the laid layers of uncured composite material; compacting the spaced-apart strips against the layers of uncured composite material; and curing or consolidating the compacted spaced-apart strips and the layers of uncured composite material to form a composite tube with controlled wrinkle formation.

2. The method of claim 1 wherein the method is for fabricating an aircraft part.

3. The method of claim 1 wherein the laying layers step further comprises disposing the layers of uncured composite material being laid against metallic end-fittings.

4. The method of claim 1 wherein the laying layers step further comprises laying discrete sections of uncured composite material against one another to form the laid-up layers of the uncured composite material around the surface or tool.

5. The method of claim 1 wherein the layers of uncured composite material comprise at least one of uncured composite material, Carbon Fiber Reinforced Plastic, Boron Fiber Reinforced Plastic, Glass Fiber Reinforced Plastic, Silicon Carbide, Alumina Fiber Reinforced Metals, or Fiber Reinforced Ceramics.

6. The method of claim 1 wherein the spaced-apart strips comprise at least one of a composite material, Carbon Fiber Reinforced Plastic, Boron Fiber Reinforced Plastic, Glass Fiber Reinforced Plastic, Silicon Carbide, Alumina Fiber Reinforced Metals, or Fiber Reinforced Ceramics.

7. The method of claim 1 wherein the spaced-apart strips comprise lengthwise oriented plies.

8. The method of claim 1 wherein the laying spaced-apart strips step further comprises laying the spaced-apart strips in substantially parallel formation around the layers of composite material.

9. The method of claim 1 wherein the spaced-apart strips each comprise at least one of a rectangular shape, an oval shape, a circular shape, or an eye shape.

10. The method of claim 1 wherein the laying steps further comprise alternately laying the layers of uncured composite material and the spaced-apart strips in order to form alternating layers of uncured composite material and spaced-apart strips.

11. The method of claim 1 wherein the compacting step further comprises using pressure to force the spaced apart strips into the underlying layers of uncured composite material.

12. The method of claim 1 wherein the at least one curing or consolidating step further comprises applying heat and pressure to consolidate the compacted spaced-apart strips and the layers of uncured composite material at an elevated curing temperature to form the composite tube.

* * * * *